Patented Nov. 4, 1952

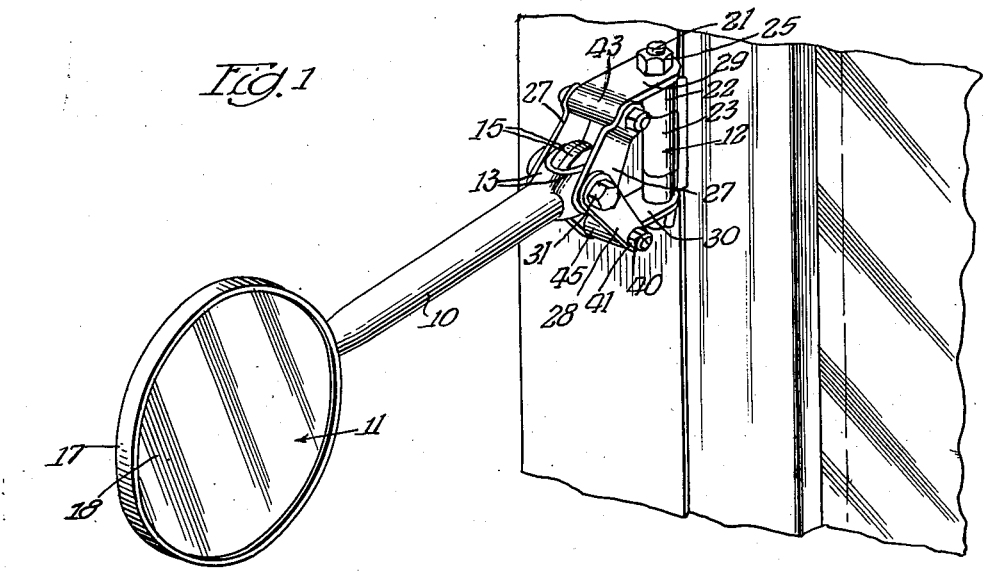
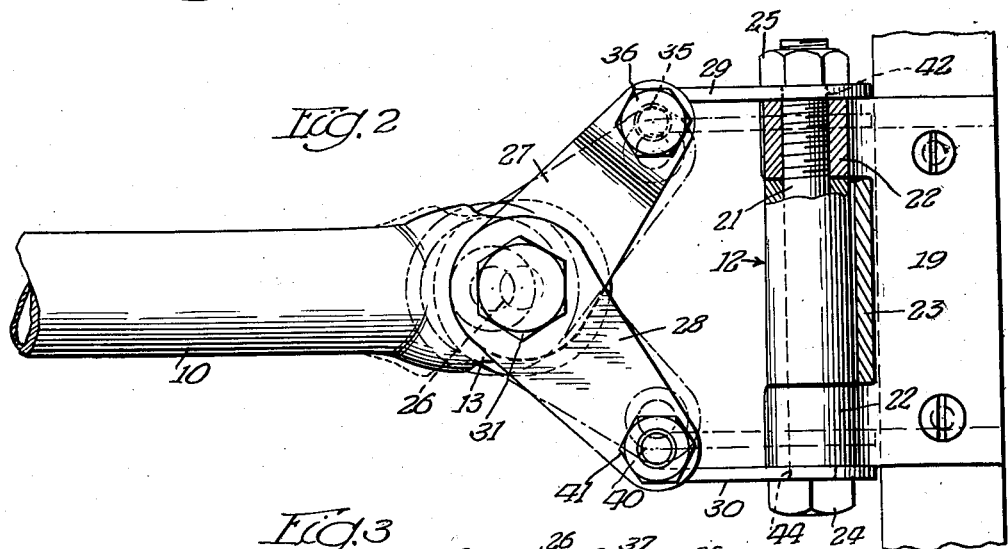
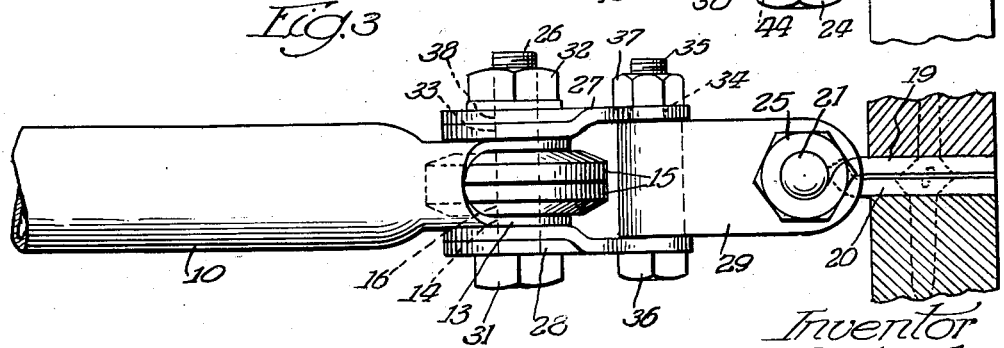

2,616,648

UNITED STATES PATENT OFFICE 2,616,648

BRACKET STRUCTURE FOR PIVOTALLY SUPPORTING REARVIEW MIRROR CARRYING ARMS

Frances Budreck, Chicago, Ill., assignor to Monarch Tool & Machinery Co., Chicago, Ill., a corporation of Illinois Application February 9, 1950, Serial No. 143,238

2 Claims. (Cl. 248—278)

The present invention relates generally to bracket structures. More particularly the invention relates to that type of bracket structure which is designed primarily for use in connection with an outwardly extending arm having a rear view mirror at its outer end, serves to connect the inner end of the arm to a vertically extending door hinge on a truck or other automotive variety vehicle, comprises a pair of horizontal, vertically spaced arms, the inner ends of which are adapted to be clamped against the end portions of the hinge brackets of the hinge and have vertically aligned holes for the hinge bolt of the hinge, and also comprises a horizontal pivot bolt which extends through spaced apart, centrally apertured ears on the inner end of the arm and permits the arm to be swung upwards and downwards with respect to the door hinge in order to locate the rear view mirror so that it may be viewed most advantageously by the operator of the truck or other vehicle with which the bracket structure is used.

One object of the invention is to provide a bracket structure of this type which is an improvement upon, and has certain inherent advantages over, previously designed bracket structures for the same purpose and is characterized by the fact that the horizontally extending, vertically spaced arms are adjustable bodily to and from one another in order that the bracket structure as a whole is capable of being applied to door hinges that vary in height without the necessity of using shims or washers.

Another object of the invention is to provide a bracket structure of the type and character under consideration in which the horizontally extending, spaced apart arms are mounted for adjustment to and from one another by way of a pair of spaced apart upwardly and inwardly inclined links, the lower ends of which have holes through which the ends of the horizontally extending pivot bolt extend and the upper ends of which are hinged to the outer end of the uppermost arm, and a pair of laterally spaced downwardly and inwardly inclined links, the upper ends of which are in lapped relation with the lower ends of the first mentioned pair of links and have holes through which the horizontally extending pivot bolt extends and the lower ends of which are hinged to the outer end of the lowermost arm.

A further object of the invention is to provide a bracket structure of the last mentioned character in which the hinge connections between the outer ends of the horizontally extending, vertically spaced arms and the adjacent ends of the links are in the form of horizontally extending sleeves on the outer ends of the arms and horizontally extending pivot bolts which extend through the sleeves and also holes in said adjacent ends of the links.

A still further object of the invention is to provide a bracket structure which is generally of new and improved construction, effectively and efficiently fulfills its intended purpose, and is characterized by simplicity of design and cheapness of construction.

Other objects of the invention and the various advantages and characteristics of the present bracket structure will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a perspective showing a bracket structure embodying the invention in its operative position wherein it serves pivotally to connect the inner end of a rear view mirror carrying arm to one of the door hinges on a truck;

Figure 2 is an enlarged side view of the bracket structure illustrating in detail the design and mode of mounting of the pairs of links between the horizontal pivot bolt at the inner end of the arm and the outer ends of the horizontally extending, vertically spaced arms; and Figure 3 is an enlarged plan view of the bracket structure showing the construction and design of the hinge connection between the outer end of the uppermost arm and the adjacent ends of the upwardly and inwardly inclined links.

The bracket structure which is shown in the drawing constitutes the preferred form or embodiment of the invention. It is designed primarily for use in connection with an arm 10 having a rear view mirror 11 at its outer end, and serves as a medium or instrumentality for connecting the arm 10 to a vertically extending door hinge 12 on a truck or other automotive vehicle. The arm 10 is formed of a metal tube and has the inner end thereof shaped to form a pair of flat, vertically extending, laterally spaced, substantially circular ears 13. These ears are provided with centrally disposed, aligned apertures 14 and are positioned in abutting and straddled relation with a pair of concavo-convex compression discs 15 which have central apertures 16 in alignment or registering relation with the apertures 14 in the ears 13 and are arranged so that the concave sides thereof face one another. The rear view mirror 11 is of standard or conventional design and consists of a shallow, cup-shaped shell 17 and a mirror 18 within the shell. The central portion of the shell is connected to the outer end of the arm 10 by a universal joint (not shown). The door hinge 12 consists of a pair of complemental hinge brackets 19 and 20 and a vertically extending hinge bolt 21. The hinge bracket 19 is suitably secured to the frame of the cab part of the truck and embodies at its outer corners a pair of vertical, spaced apart, tubular members 22. The hinge bracket 20 is suitably secured to the door of the cab part of the truck and embodies on the central portion of the outer side margin an integral, vertically extending, tubular member 23 which, as shown in the drawing, is disposed between and aligned with, the tubular members 22 on the outer corners of the hinge bracket 19. The hinge bolt 21 extends through the tubular members 22 and 23 and has a head 24 at the lower end of the shank thereof and a clamp nut 25 on the upper end of its shank.

As its components the bracket structure comprises a horizontally extending pivot bolt 26, a pair of laterally, spaced, upwardly and inwardly extending links 27, a pair of laterally spaced, downwardly and inwardly extending links 28, an upper arm 29 and a lower arm 30. As hereinafter described more in detail the bracket structure serves not only to connect the inner end of the arm 10 to the door hinge 12, but also to support the arm so that it is capable of being swung upwards and downwards into different angular positions.

The horizontally extending pivot bolt 26 extends through the apertures 14 in the ears 13 and the apertures 16 in the compression discs 15 and embodies a head 31 at one end of the shank thereof and a clamp nut 32 at the other end of its shank. The purpose of the pivot bolt 26 is twofold. In the first place it serves as a pivotal support or mount for the lower ends of the links 27 and the upper ends of the links 28. Secondly it constitutes the articulation axis about which the arm 10 is capable of swinging upwards and downwards.

The links 27 are preferably in the form of plate metal stampings in order that they are for all intents and purposes rigid. The lower ends of the links 27 fit against the outer surfaces of the ears 13 on the inner end of the arm 10 and have circular apertures 33 through which extends the shank of the pivot bolt 26. The upper ends of the links 27 are outwardly offset and have aligned apertures 34 through which the shank of a horizontally extending pivot bolt 35 extends. The bolt 35 has a head 36 at one end of the shank thereof and a clamp nut 37 on the other end of its shank.

The downwardly and inwardly extending links 28 of the bracket structure, like the links 27, are preferably formed of plate metal stampings. The upper ends of the links 28 fit against the outer surfaces of the lower ends of the links 27 and have aligned apertures 38 through which the shank of the horizontal pivot bolt 26 extends. The lower ends of the links 28 have aligned apertures 39 through which the shank of a horizontally extending pivot bolt 40 extends. The bolt 40 has a head 41 at one end of the shank thereof and embodies a clamp nut (not shown) at the other end of its shank. When the nut 32 on the horizontal pivot bolt 26 is loosened the links 27 and 28 are capable of being swung towards and away from one another. When the nut 32 is tightened the links 27 and 28 are clamped in their angularly adjusted position although the arm 10, due to the action of the compression discs 15, is free to swing upwards and downwards about the pivot bolt 26.

The outer arm 29 is flat and horizontally elongated. It projects inwards from the upper ends of the links 27 and is preferably in the form of a one-piece plate metal stamping. The inner end of the arm 29 is clamped between the upper end of the uppermost tubular member 22 on the hinge bracket 19 and the nut 25 on the vertically extending hinge bolt 21 and has an aperture 42 through which extends the shank of the bolt 25. The outer end of the arm 29 is shaped to form a sleeve 43 which is interposed between the upper ends of the links 27. The shank of the pivot bolt 35 extends through the sleeve 43 and forms with the latter a hinge connection between the outer end of the arm 29 and the upper ends of the links 27. Such connection permits the arm 29 to be maintained in a horizontal position when the links 27 are angularly adjusted about the pivot bolt 35.

The lower arm 30 is flat and horizontally elongated. It projects inwards from the lower ends of the links 28 and, like the upper arm 29, is in the form of a one-piece plate metal stamping. The inner end of the arm 30 is clamped between the lower end of the lowermost tubular member 22 on the hinge bracket 19 and the head 24 on the shank of the hinge plate 21. It has an aperture 44 through which extends the shank of said bolt. The outer end of the lower arm 30 is shaped to form a sleeve 45 which is interposed between the lower ends of the links 28. The shank of the pivot bolt 40 extends through the sleeve 45 and forms with the latter a hinge connection between the outer end of the lower arm 30 and the lower ends of the links 28. Such connection permits the arm 30 to be maintained in a horizontal position when the links 28 are angularly adjusted about the pivot bolt 26.

When it is desired to apply the bracket structure to the door hinge 12 the hinge bolt 21 is removed from the tubular members 22 and 23 on the hinge brackets 19 and 20 by removing the nut 25 and then sliding the bolt 21 downwards. Thereafter the nut on the pivot bolt 26 and the nut on the pivot bolts 35 and 40 are loosened and the links 27 and 28 are angularly adjusted with respect to one another until the arms 29 and 30 are spaced apart a distance corresponding to the height of the hinge brackets 19 and 20 of the door hinge 12. After proper angular adjustment of the links 27 and 28 the inner end of the arm 29 is placed on the upper end of the uppermost tubular member 22 and the inner end of the arm 30 is positioned against the lower end of the lowermost tubular member 22. At the conclusion of this operation the hinge bolt 21 is slid back into place and the nut 25 is applied to the upper end of the shank of the bolt and tightened so as to clamp the inner ends of the arms 29 and 30 against the outermost ends of the tubular members 22. After tightening of the nut 25 the nuts on the pivot bolts 35 and 40 and the nut 32 on the pivot bolt 36 are tightened. After tightening of such nuts the bracket structure as a whole is in the form of a rigid unit, although it permits, as previously pointed out, upward and downward swinging of the arm 10.

The herein described bracket structure effectively and efficiently fulfills its intended purpose and is characterized by the fact that its design and construction permit it to be applied with facility to door hinges that vary in height. It is essentially simple in construction and hence is capable of being produced at a reasonable cost.

The invention is not to be understood as restricted to the details set forth since these may be modified within the scope of the appended claims without departing from the spirit and scope of the invention.

Having thus described the invention what I claim as new and desire to secure by Letters Patent is:

1. As a new article of manufacture, a bracket structure operative pivotally to connect to a conventional vertically extending door hinge on a vehicle an arm projecting away from the hinge and having a rear view mirror at its outer end, and comprising a horizontal pivot element adapted to extend through the inner end of the mirror carrying arm and to support the arm so that it is capable of being swung upwards and downwards, two links pivotally connected at certain ends thereof to the horizontal pivot element, arranged so that one is inclined upwards away from the mirror carrying arm and the other is inclined downwards away from said arm, and adapted to be angularly adjusted toward and away from one another, and two parallel, horizontally extending, vertically spaced arms having certain adjacent ends thereof provided with means for connection to the ends of the hinge and having their other ends pivotally connected to the other ends of the links in such manner that their parallelism may be maintained in connection with angular adjustment of the links toward and away from one another.

2. As a new article of manufacture, a bracket structure operative pivotally to connect to a conventional vertically extending door hinge on a vehicle an arm projecting away from the hinge and having a rear view mirror at its outer end, and comprising a horizontal pivot element adapted to extend through the inner end of the mirror carrying arm and to support the arm so that it is capable of being swung upwards and downwards, two pairs of links pivotally connected at certain ends thereof to the horizontal pivot element, arranged so that the links of one pair are spaced laterally apart and are inclined upwards away from the mirror carrying arm and the links of the other pair are spaced laterally apart and are inclined downwards away from said arm, and adapted to be angularly adjusted towards and away from one another, a horizontally extending upper arm having one end thereof provided with means for connection to the upper end of the door hinge and embodying at its other end a horizontal sleeve between the upper ends of the pair of upwardly inclined links, a horizontally extending lower arm disposed beneath and in parallel relation with the upper arm, having one end thereof provided with means for connection to the lower end of the door hinge, and embodying at its other end a horizontal sleeve between the lower ends of the pair of downwardly inclined links, a horizontal nut equipped pivot bolt extending through said upper ends of the pair of upwardly inclined links and also through the sleeve on the upper arm and forming with the last mentioned sleeve a hinge connection between the upper arm and the pair of upwardly inclined links, and a second horizontal nut equipped pivot bolt extending through said lower ends of the pair of downwardly inclined links and also through the sleeve on the lower arm and forming with the last mentioned sleeve a hinge connection between the lower arm and the pair of downwardly inclined links.

FRANCES BUDRECK.

REFERENCES CITED

The following references are of record in the file of this patent:

UNITED STATES PATENTS

| Number | Name | Date |
|---|---|---|
| 1,938,350 | Oishel et al. | Dec. 5, 1933 |
| 2,134,016 | Zink | Oct. 25, 1938 |
| 2,523,118 | Jones | Sept. 19, 1950 |